United States Patent
Melis et al.

(10) Patent No.: US 6,329,761 B1
(45) Date of Patent: Dec. 11, 2001

(54) FREQUENCY CONTROLLED HALF-BRIDGE INVERTER FOR VARIABLE LOADS

(75) Inventors: Janos Melis; Oscar Vila-Masot, both of Miami, FL (US)

(73) Assignee: EBS International Corporation, Miami, FL (US)

( * ) Notice: Subject to any disclaimer, the term of this patent is extended or adjusted under 35 U.S.C. 154(b) by 0 days.

(21) Appl. No.: 09/608,625

(22) Filed: Jun. 30, 2000

(51) Int. Cl.⁷ .................................................. H05B 37/02
(52) U.S. Cl. .................... 315/209 R; 315/219; 315/224; 315/DIG. 7
(58) Field of Search .................... 315/209 R, DIG. 7, 315/DIG. 2, 219, 224

(56) References Cited

U.S. PATENT DOCUMENTS

| | | | |
|---|---|---|---|
| 5,097,183 | 3/1992 | Vila-Masot et al. | 315/226 |
| 5,229,927 | 7/1993 | Vila-Masot et al. | 363/23 |
| 5,932,976 | * 8/1999 | Maheshwari et al. | 315/291 |

* cited by examiner

*Primary Examiner*—David Vu
(74) *Attorney, Agent, or Firm*—Hoffman, Wasson & Gitler

(57) ABSTRACT

The invention pertains to a switchmode power inverter, and particularly to a frequency controlled half-bridge inverter. More particularly, the invention pertains to high frequency ballast for gas discharge devices, especially for high intensity discharge lamps, completed by an internal high voltage ignition circuit and an external control apparatus for dimming.

9 Claims, 8 Drawing Sheets

FREQUENCY CONTROLLED HALF-BRIDGE INVERTER FOR VARIABLE LOADS

BACKGROUND OF THE INVENTION

1. Field of the Invention

The present invention relates to high frequency switch-mode power inverters and specifically to high frequency electronic ballasts for gas discharge devices. More specifically, the present invention relates to a high frequency electronic ballast for high intensity discharge (HID) lamps.

2. Prior Art

The prior art is replete with many known circuits providing high frequency ballast for gas discharge lamps, especially for high intensity (HID) lamps. For instance, high efficient electronic ballasts which can be used with HID (HPS) lamps are U.S. Pat. No. 5,097,183, entitled "Master-Slave Half-Bridge DC-to-AC Switchmode Power Inverter" and U.S. Pat. No. 5,229,927, entitled "Self-Symmetrizing and Self-Oscillating Half-Bridge Power Inverter", assigned to the assignee of the present invention.

An important application of switchmode power inverters is supplying gas discharge devices, especially high intensity discharge (HID) lamps in the range of 35W to 400W. In this case, the load impedance of the inverter is a HID lamp connected in series with an inductor. In the case of a high frequency powering of the HID lamp, the interaction between the high frequency ballast and the lamp is stronger than that of a conventional low frequency (50/60 Hz) ballast. The high frequency ballast can be significantly better than a conventional low frequency (50/60 Hz) ballast due to its lessened weight and essentially high efficiency. Additionally, the high frequency ballast, utilized with an HID lamp would have a simple, reliable dimming capability and an essentially more reliable light switch (day and night switch) than the conventional low frequency ballasts.

Therefore, the critical design targets for high frequency ballasts supplying HID lamps would be the following:

a) very high efficiency, >94% (energy saving and low temperature rise of the critical components);
b) fully controlled lamp power eliminating the effects of input voltage fluctuation and the lamp aging;
c) dimming capability, from 100% to 50% (35%);
d) automatic light switching (day and night time switch);
e) over temperature protection;
f) automatic switch off in the case of lamp failure;
g) instant re-ignition of the warmed up lamp; and
h) isolated interface circuit providing the connection of several ballasts and therefore implementing fully controlled lighting system.

SUMMARY OF THE INVENTION

It is an object of the present invention to provide a high frequency switchmode half-bridge square wave inverter which has a substantially increased efficiency in a wide frequency and temperature range.

A second object of the present invention to provide an electronic ballast for gas discharge devices having substantially increased efficiency, stability and reliability.

A further object of the present invention to provide an electronic ballast for high intensity discharge lamps implementing the ideal ballast curve.

Another object of the present invention to provide a high frequency and high voltage ignition circuit for a reliable ignition of HID lamps, especially the instant re-ignition of warmed-up lamps, in a very wide temperature range.

A further object of the present invention to provide an electronic ballast for high intensity discharge lamps with built-in dimming capability.

Another object of the present invention to provide an electronic ballast for high intensity discharge lamps with built-in light switch controlled externally by a simple photoresistor.

These and other objects, features and advantages of the present invention will be more readily apparent from the following detailed description, wherein reference is made to the drawings.

DETAILED DESCRIPTION OF THE INVENTION

Figure 1:
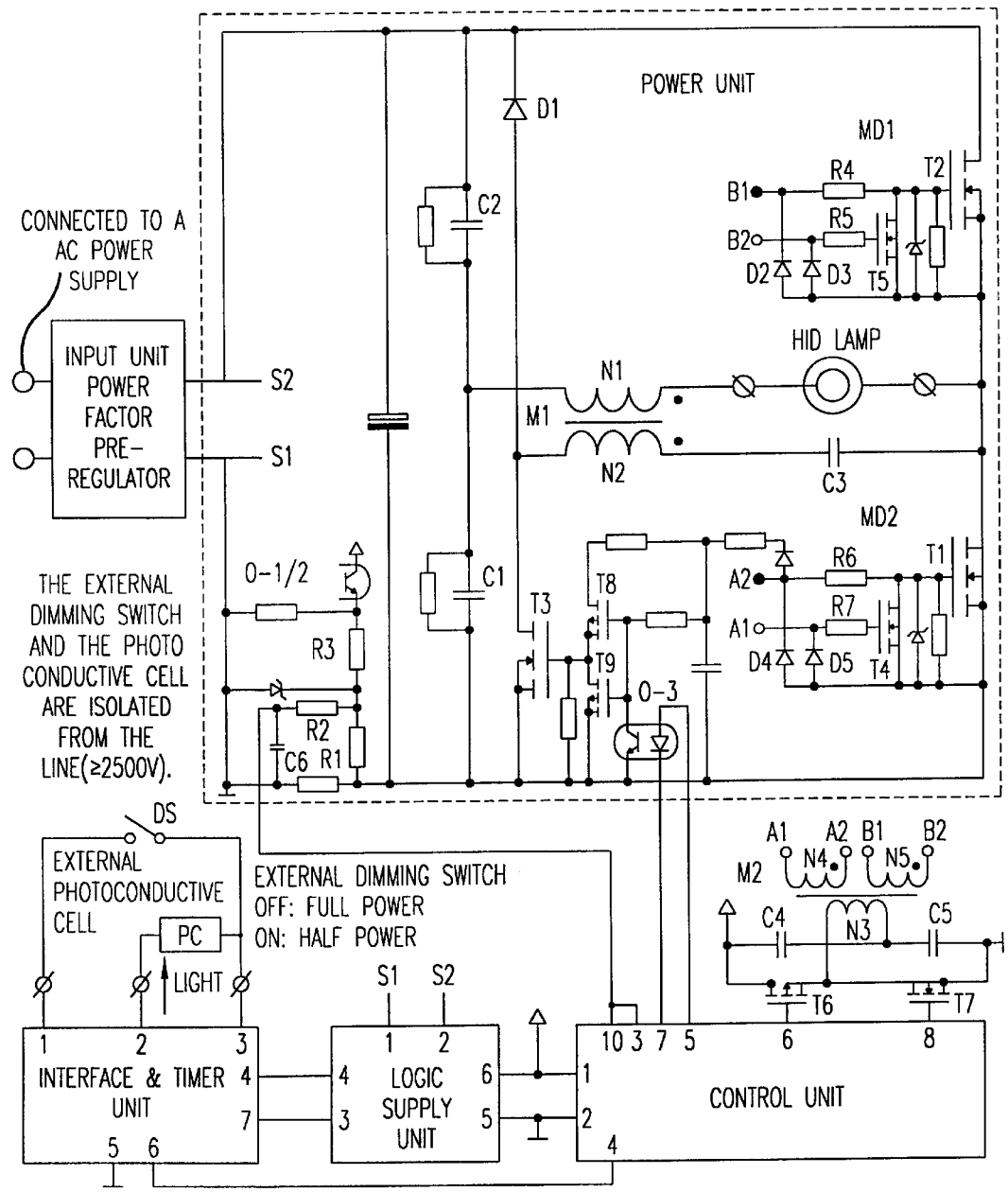
FIG. 1 illustrates a schematic diagram of the preferred electronic ballast for HID lamps including a Power Unit with Ignitor, Control Unit, Logic Supply Unit and an Interface/Timer(I/T) Unit.

FIG. 1 shows a schematic diagram of the preferred electronic ballast where the Power Unit (connected to an input unit) is illustrated in detail. The Input Unit includes filters, a bridge rectifier and optionally a power factor pre-regulator known to practitioners in the art and need not be described herein. Furthermore, the Control Unit, Logic Supply Unit and Interface & Timer Unit (I/T Unit) which are shown as blocks and will be described hereinbelow.

The Power Unit includes the basic components of a halfbridge inverter: two electronically-controlled switches (MOSFET T1 and T2), two voltage divider capacitors (capacitor C1 and C2) and a load impedance (a HID lamp) connected in series with a winding N1 of an inductor M1.

The Power Unit also includes a preferred embodiment of a high voltage ignition apparatus in which winding N2 is connected in series with a capacitor C3 and a transistor T3. When transistor T3 is on, a high frequency damped sinusoidal voltage, repeated with the half period time of the inverter, occurs across the winding N2. This voltage is transformed by winding N1 to approximately 1500V, providing sufficient ignition voltage for HID lamps, also achieving instant re-ignition of warmed-up lamps. The ON-time of transistor T3 is controlled by the Control Unit connected to driver transistors T8 and T9 through opto-isolator O-3.

The Power Unit further includes a preferred embodiment of a MOSFET driver utilized by the present invention. As it is shown in FIG. 1, two identical MOSFET drivers MD1 and MD2 are provided. MOSFET driver MD1 includes a transistor T5, as well as rectifiers D2 and D3 and resistors R4 and R5 connected to the main transistor switch T2. Inputs B1 and B2 are connected to one of the secondary windings N5 of a control transformer M2. MOSFET driver MD2 includes a transistor T4, as well as rectifiers D4 and D5 and resistor R6 and R7 connected to the main transistor switch T4. Inputs Al and A2 are connected to one of the secondary windings N4 of the control transformer M2.

The control transformer M2 provides a square wave AC control signal. During the positive half-period, with respect to the point sign of the secondary winding N4, a positive voltage is connected across the resistor R6 and rectifier D4 to the gate of the N-channel MOSFET T4 of MOSFET driver MD2 providing the ON state. Therefore, the gate of MOSFET T1 is short-circuited to its source by MOSFET T4, providing an excellent current sink capability and a very short switching time for the MOSFET T1. Obviously, the DC loss of the described MOSFET driver is very low. The most significant advantage of this driver description can be applied for the upper MOSFET drivers. A similar configuration will be described with respect to the MOSFET driver MD1. In this situation, during the positive half-period, with respect to the point sign of the secondary winding N5, a positive voltage is connected across the resistor R4 and rectifier D2 to the gate of the N-channel MOSFET T2 providing the ON state. During the negative half-period, a positive voltage is connected across resistor R5 and rectifier D3 to the gate of MOSFET T5 providing the ON state. Therefore, the gate of MOSFET T2 is short-circuited to its source by MOSFET T5. Consequently, a very low power loss can be achieved with respect to the switching transistors T1 and T2, resulting a very high efficiency for the global circuit.

The Power Unit also includes a power resistor R1 in which the current is unidirectional but fluctuated with 120 Hz. The voltage across the resistor is filtered by capacitor C6 and resistor R2, and therefore, the voltage across C6 is nearly DC and proportional to the average load current. This voltage—supposing nearly constant supply voltage—is also proportional to the input power which is nearly equal to the lamp power. Therefore, the control of the lamp power can be easily implemented, as shall be further explained.

Figure 2:
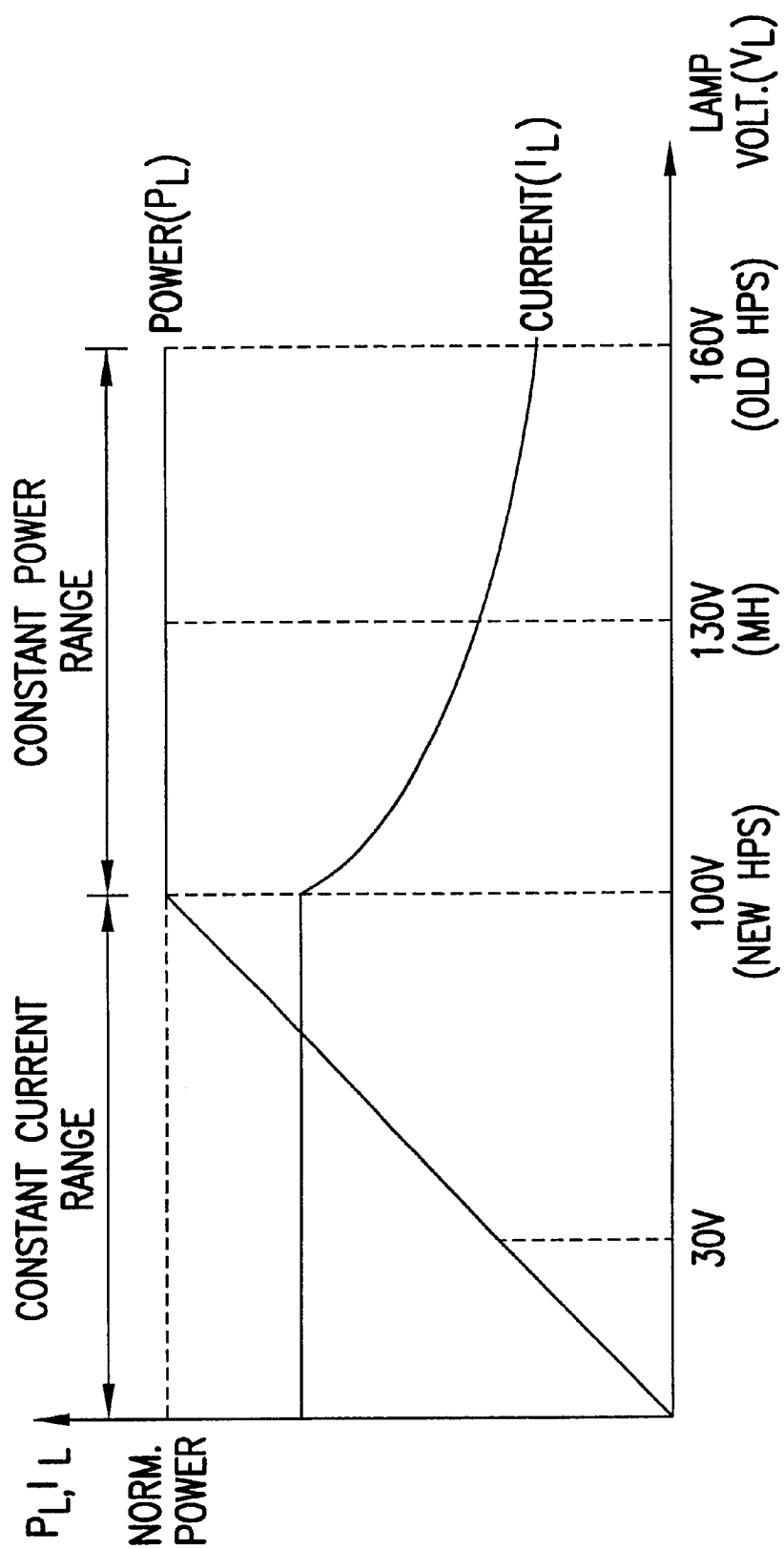
FIG. 2 shows the ballast curve and the corresponding lamp current realized by the preferred electronic ballast.

FIG. 2 illustrates the ballast curve as diagram of the functional relationship between the lamp power and the lamp voltage. Two different ranges can be distinguished depending on the lamp voltages, namely:

1. constant lamp current range in the warming up period; and
2. Constant lamp power range in a certain range of lamp voltage.

The constant lamp power range depends on the lamp type: 80V–160V for HPS lamps and 120V–150V for MH lamps.

Figure 3:
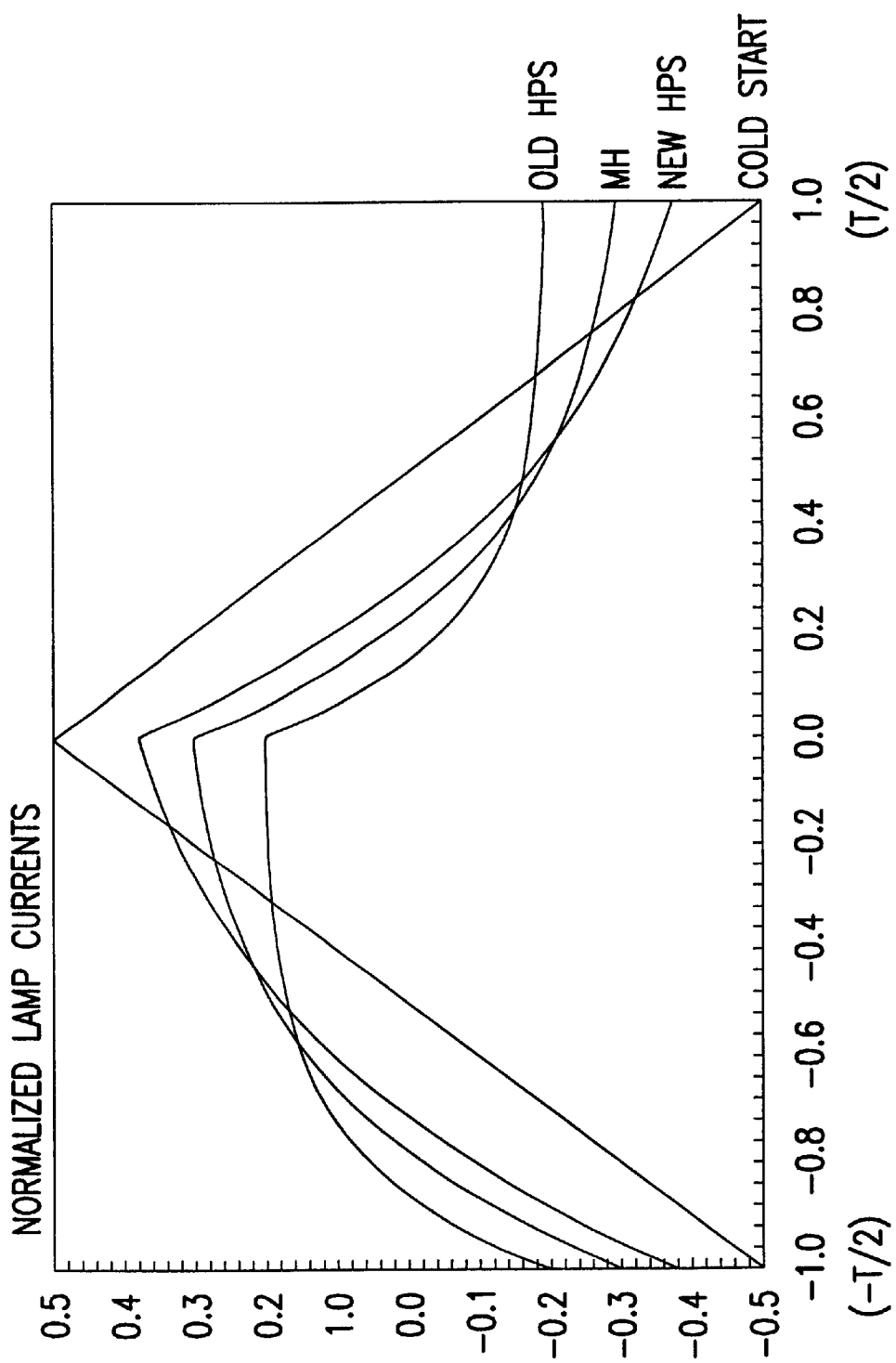
FIG. 3 illustrates the lamp current waveforms used for various for HPS and MH lamps.

FIG. 3 shows a normalized lamp current diagram where the wave forms are parametrized by typical lamp voltages, namely: old HPS (160V), MH (130V), new HPS (80V) and cold start (20V) which is practically equivalent to the short circuit condition. As it can be seen in FIG. 3, the lamp current is always continuous and piecewise exponential.

Figure 4:
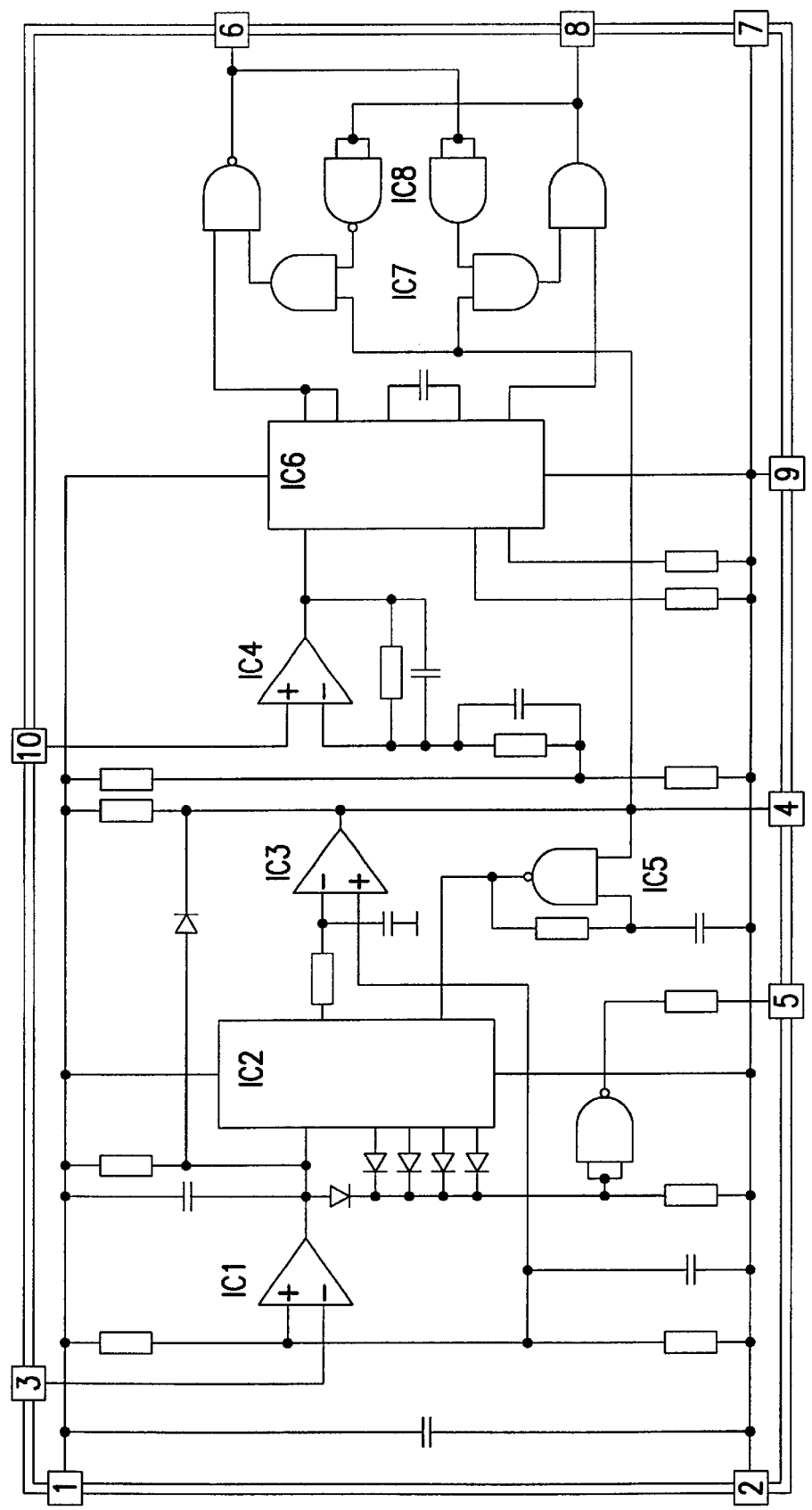
FIG. 4 shows the preferred embodiment of the control unit used as a driver and frequency controller.

FIG. 4 shows a detailed schematic diagram of the Control Unit providing appropriate control signals for the Power Unit. Functionally, the Control Unit has four basic parts, namely:

1. a timer and oscillator;
2. a voltage controlled oscillator (VCO);
3. a logic driver; and
4. a low power signal transformer.

The timer and oscillator includes voltage comparators IC1 and IC3, a 14 bit ripple counter IC2, and an oscillator based on the Schmitt trigger IC5. The output 5 provides the control signal for the ignitor. The counter is controlled via an output 3 in such a way that if ignition of the lamp failed, the power unit will be switched off within six minutes. The voltage controlled oscillator IC6 provides square wave signal (D=0.5) for the driver. The frequency of the oscillator is controlled by the operational amplifier IC4 in such a way that the lamp power remains constant in a predetermined lamp voltage range (80V–160V for HPS lamps and 120V–150V for MH lamps). The logic driver including logic gates IC7 and IC8 and provides appropriate signals for the MOSFETs T6 and T7 shown in FIG. 1, avoiding cross current conduction. The low power signal transformer M2 also shown in FIG. 1, provides isolation between the Control Unit and the Power Unit.

Figure 5:
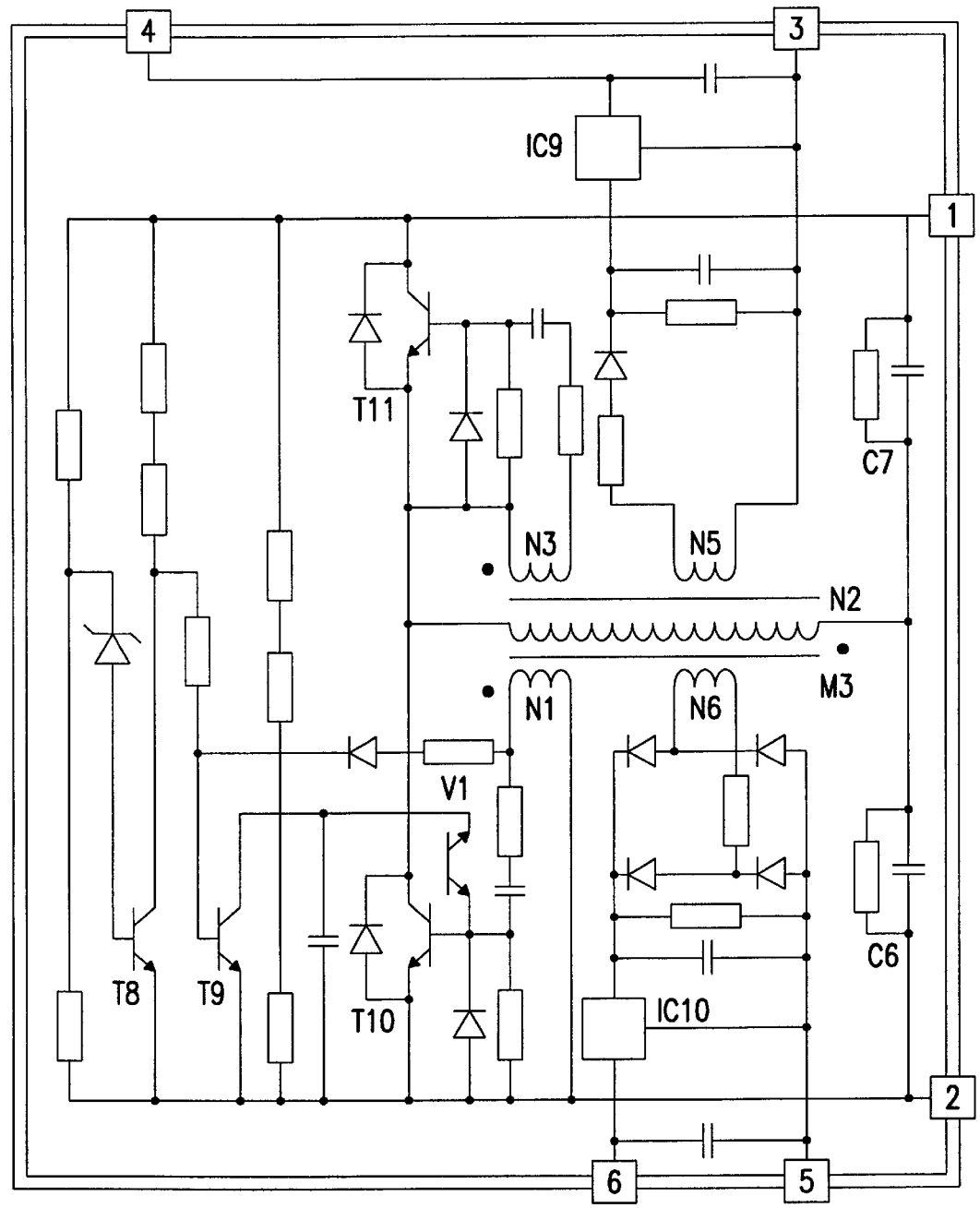
FIG. 5 illustrates the preferred embodiment of the logic supply unit providing stabilized supply voltages for the other units.

FIG. 5 shows the preferred embodiment of a low power Logic Supply Unit based on a self-oscillating half-bridge configuration. The inputs 1 and 2 provide supply voltage for the logic supply. The transformer M3 includes five windings: a primary winding N2 connected between the common points of the main switching transistors and voltage divider capacitors of the half-bridge configuration, feedback windings N1 and N3, secondary windings N5 and N6 providing unstabilized voltages for the linear regulators IC9 and IC10, transistors T8 and T9 and diac V1 provide a starter circuit for transistor T10 and T11, which are the main controlled switch of the self-oscillating half-bridge configuration. The outputs 3 and 4 provide 12V stabilized logic supply for the I/T Unit. The output 5 and 6 provide 12V stabilized logic supply for the Control Unit.

Figure 6:
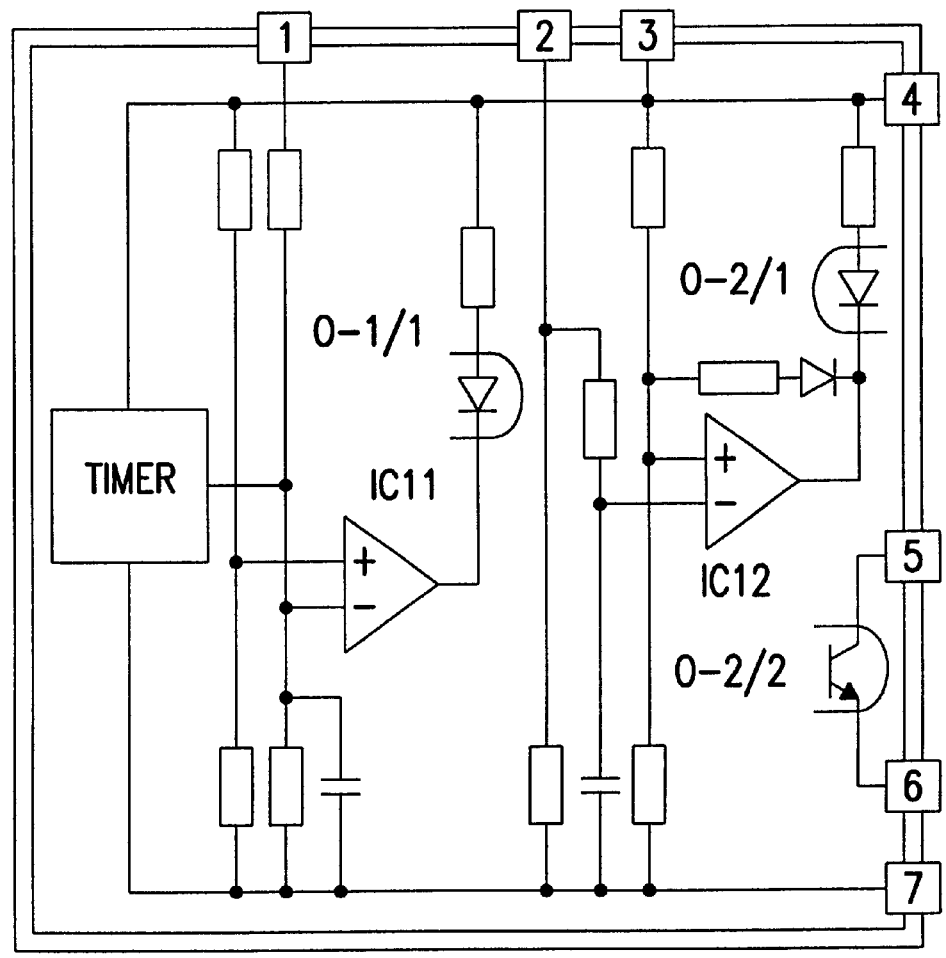
FIG. 6 shows the preferred embodiment of the I/T Unit implementing a programmable timer and external control for dimming and light switching.

FIG. 6 shows the preferred embodiment on the Interface & Timer Unit (I/T Unit) providing an isolated external control of the ballast. The Interface part includes the comparators IC11 and IC12 where an isolated (4000V) control connection to the Power Unit and the Control Unit is implemented by opto-isolators O-1 and O-2. As it is shown in FIG. 1, a low power switch DS, functioning as dimming switch, can be connected to input 1 and 3 of the I/T Unit. Furthermore, for implementing automatic light switch (day/night switch) a photoconductive cell (photoresistor) PC can be connected to the inputs 2 and 3 of the I/T Unit. These inputs connected to a low power switch can be also utilized as a remote ON/OFF switch of the ballast.

Figure 7:
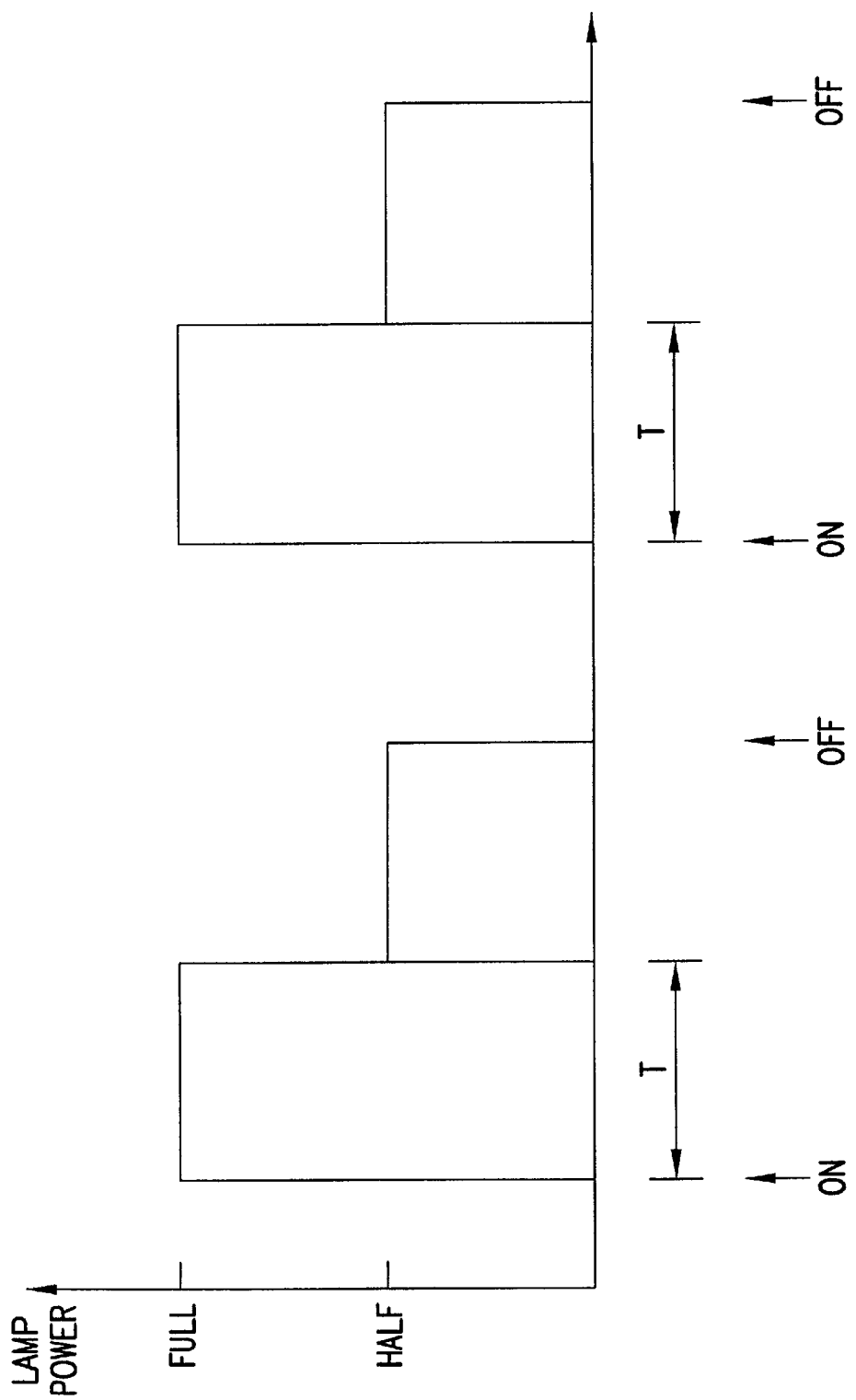
FIG. 7 illustrates the timing diagram of the optional automatic dimming provided by the preferred programmable timer.

An optional programmable Timer provides a timed dimming capability for the ballast essentially increasing energy saving. The corresponding timing diagram is shown in FIG. 7.

Figure 8:
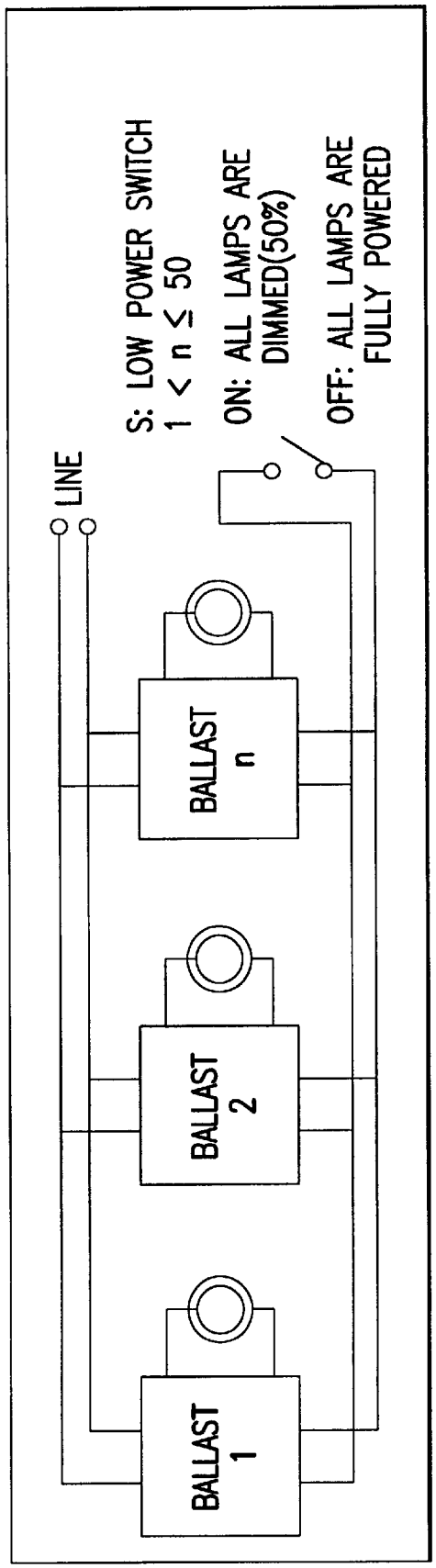
FIG. 8 shows the implementation of a controlled lighting system provided by the preferred electronic ballast.

FIG. 8 illustrates a schematic diagram for preferred implementation of a centrally-controlled lighting system provided by the isolated external control feature of a preferred individual electronic ballast.

Thus, while preferred embodiment of the present invention have been shown and described in details, it is to be understood that such adaptation and modifications, as may occur to those skilled in the art, may be employed departing from the spirit and scoping of the invention, as set forth in the claims.

What is claimed is:

1. A frequency controlled inverter for variable loads comprising:

a sinusoidal AC power supply;

a power factor pre-regulator connected to said sinusoidal AC power supply;

a gas discharge device acting as a light source acting as a variable load impedance;

a power unit connected to said power factor preregulator including a high voltage ignitor.connected to said gas discharge device;

a frequency control unit connected to said power unit;

an interface and timer unit acting as an external remote control for the frequency controlled inverter and connected to said frequency control unit;

a low power AC-to-DC converter acting as a stabilized logic supply source connected to said frequency control unit and said interface and timer unit; and a wherein the ignition and the current of said gas discharge device is controlled by said frequency control unit providing instant re-ignition and ideal ballast curve for said gas discharge device.

2. The frequency controlled inverter for variable loads in accordance with claim 1, wherein said power unit comprises a half-bridge inverter including first and second electronically controlled switches connected in series, first and second voltage divider capacitors, a power resistor connected to said first and second electronically controlled switches, a first resistor and a capacitor connected to said power resistor in series acting as an RC filter, an inductor including first and second windings, wherein said first winding is connected to the common point of said first and second voltage divider capacitors and said variable load is connected to the common point of said first and second electronically controlled switches.

3. The frequency controlled inverter for variable loads in accordance with claim 2, wherein said first and second electronically controlled switches are power MOSFETs and further including a first MOSFET driver circuit connected to said first electronically controlled switch and an identical second MOSFET driver connected to said second electronically controlled switch, wherein each of said first and second MOSFET drivers comprise a low power MOSFET, at least two rectifiers and two resistors, providing a very low impedance path in OFF states for said power MOSFETs.

4. The frequency controlled inverter for variable loads in accordance with claim 3, wherein said frequency control unit comprises a voltage controlled timer connected to said RC filter, an operational amplifier, a voltage controlled oscillator connected to said operational amplifier, a logic driver connected to said voltage controlled oscillator, a low power signal transformer including at least three windings connected to said logic driver, wherein the first and the second windings of said low power signal transformer are connected to said first and second MOSFET drivers.

5. The frequency controlled inverter for variable loads in accordance with claim 1, wherein said interface and timer unit comprises a programmable timer, first and second comparators, an external low power switch connected to said first comparator providing a remote dimming control, an external photoconductive cell connected to said second comparator providing an automatic light switching control, at least two opto-isolators connected to said frequency control unit providing an isolated control connection between the frequency controlled inverter and said external photoconductive cell and said external low power switch.

6. The frequency controlled inverter for variable loads in accordance with claim 1, wherein said stabilized logic supply source comprises a low power self-oscillating half-bridge oscillator providing at least two stabilized logic supplies for said frequency control unit and said interface and timer unit.

7. The frequency controlled inverter for variable loads in accordance with claim 1, wherein said power unit includes an inductor provided with first and second windings and a high voltage ignitor comprising a capacitor, an electronically controlled switch connected in series with said capacitor and the second winding of said inductor, wherein said electronically controlled switch is connected to the output of a voltage controlled timer providing high voltage and high frequency instant re-ignition signal for said gas discharge device and further wherein the ON and OFF states of said high voltage ignitor is controlled by said voltage controlled timer in such a way that at a failed ignition, said high voltage ignitor will be switched off within an appropriate time interval depending on the particular gas discharge device.

8. The frequency controlled inverter for variable loads in accordance with claim 4, wherein said high voltage ignitor comprising a capacitor, an electronically controlled switch connected in series with said capacitor and the second winding of said transformer, wherein said electronically controlled switch is connected to the output of said voltage controlled timer providing high voltage and high frequency instant re-ignition signal for said gas discharge device and further wherein the ON and OFF states of said high voltage ignitor is controlled by said voltage controlled timer in such a way that at failed ignition said high voltage ignitor will be switched off within an appropriate time interval depending on the applied gas discharge device.

9. A frequency controlled inverter for variable loads in accordance with claim 1, wherein said gas discharge device is a high intensity discharge lamp including mercury, metal halide and high pressure sodium lamps.

* * * * *